United States Patent

Gitt et al.

(10) Patent No.: US 12,358,362 B2
(45) Date of Patent: Jul. 15, 2025

(54) HYBRID DRIVE DEVICE

(71) Applicant: MERCEDES-BENZ GROUP AG, Stuttgart (DE)

(72) Inventors: Carsten Gitt, Stuttgart (DE); Jonathan Zeibig, Aalen (DE); Peter Hahn, Stuttgart (DE); Tobias Schilder, Ludwigsburg (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 18/833,511

(22) PCT Filed: Jan. 13, 2023

(86) PCT No.: PCT/EP2023/050718
§ 371 (c)(1),
(2) Date: Jul. 26, 2024

(87) PCT Pub. No.: WO2023/143930
PCT Pub. Date: Aug. 3, 2023

(65) Prior Publication Data
US 2025/0100369 A1 Mar. 27, 2025

(30) Foreign Application Priority Data
Jan. 27, 2022 (DE) .................... 10 2022 000 329.5

(51) Int. Cl.
*B60K 6/365* (2007.10)
*B60K 6/387* (2007.10)
(Continued)

(52) U.S. Cl.
CPC ............. *B60K 6/365* (2013.01); *B60K 6/387* (2013.01); *B60K 6/40* (2013.01); *B60K 6/52* (2013.01);
(Continued)

(58) Field of Classification Search
CPC ................ F16H 2200/201; F16H 3/66; F16H 2200/2038; F16H 3/72; B60K 6/365;
(Continued)

(56) References Cited

U.S. PATENT DOCUMENTS 6,953,409 B2 * 10/2005 Schmidt ................ B60W 20/40
475/5
7,101,298 B2 * 9/2006 Sowul .................... B60K 6/365
475/5
(Continued)

FOREIGN PATENT DOCUMENTS

DE 102005022300 A1 12/2005
DE 102010012259 A1 10/2010
(Continued)

OTHER PUBLICATIONS

International Search Report and Written Opinion mailed Mar. 20, 2023 in related/corresponding International Application No. PCT/EP2023/050718.
(Continued)

*Primary Examiner* — Roger L Pang
(74) *Attorney, Agent, or Firm* — PATENT PORTFOLIO BUILDERS PLLC

(57) ABSTRACT

A hybrid drive device includes an internal combustion engine, an electric motor having a rotor, and a gearbox having an input planetary gearing with a main axis of rotation. The internal combustion engine is connected to the input planetary gearing via a disconnect clutch. The input planetary gearing has exactly two planetary gear sets each with three elements. The third element is connected to the sixth element to conjointly rotate and the second element is connected to the fifth element to conjointly rotate. The rotor is coupled to the third element such that torque originating from the rotor is introduced into the gearbox via the third element and the sixth element. The gearbox has a third
(Continued)

planetary gear set with three further elements. The second element is connected to the seventh element to conjointly rotate and the eighth element is connected to a driven gear to conjointly rotate.

9 Claims, 2 Drawing Sheets

(51) Int. Cl.
| | |
|---|---|
| B60K 6/40 | (2007.10) |
| B60K 6/52 | (2007.10) |
| B60K 6/547 | (2007.10) |
| B60K 17/354 | (2006.01) |
| B60K 17/356 | (2006.01) |
| B60W 10/02 | (2006.01) |
| B60W 10/06 | (2006.01) |
| B60W 10/08 | (2006.01) |
| B60W 10/115 | (2012.01) |
| B60W 20/15 | (2016.01) |
| F16H 3/64 | (2006.01) |
| F16H 3/72 | (2006.01) |

(52) U.S. Cl.
CPC .......... *B60K 6/547* (2013.01); *B60K 17/354* (2013.01); *B60K 17/356* (2013.01); *B60W 10/02* (2013.01); *B60W 10/06* (2013.01); *B60W 10/08* (2013.01); *B60W 10/115* (2013.01); *B60W 20/15* (2016.01); *F16H 3/64* (2013.01); *F16H 3/72* (2013.01); *B60Y 2200/92* (2013.01); *B60Y 2400/73* (2013.01); *B60Y 2400/82* (2013.01); *F16H 2200/201* (2013.01)

(58) Field of Classification Search
CPC . B60K 6/40; B60K 6/52; B60K 6/547; B60K 17/35; B60K 17/356
USPC .......................... 475/5, 317, 339, 340; 477/5
See application file for complete search history.

(56) References Cited

U.S. PATENT DOCUMENTS

| | | | |
|---|---|---|---|
| 7,235,029 B2 | 6/2007 | Klemen et al. | |
| 11,519,481 B2* | 12/2022 | Beaudoin | B60K 1/00 |
| 12,103,398 B2* | 10/2024 | Gitt | B60K 6/547 |
| 2004/0077448 A1 | 4/2004 | Oshidari et al. | |
| 2009/0253544 A1 | 10/2009 | Foster et al. | |
| 2018/0043881 A1* | 2/2018 | Hirasawa | B60W 20/13 |
| 2024/0181865 A1 | 6/2024 | Gitt et al. | |

FOREIGN PATENT DOCUMENTS

| | | |
|---|---|---|
| DE | 102017006082 A1 | 1/2019 |
| DE | 102021001879 A1 | 10/2022 |

OTHER PUBLICATIONS

Office Action created Sep. 9, 2022 in related/corresponding DE Application No. 10 2022 000 329.5.

* cited by examiner

| STATE | K0 | SK | SA | SB |
|---|---|---|---|---|
| EVT A | ● | | ● | |
| Gear 1 | ● | ● | ● | |
| Gear 2 | ● | | ● | ● |
| Gear 3 | ● | ● | | ● |
| EVT B | ● | | | ● |

HYBRID DRIVE DEVICE

BACKGROUND AND SUMMARY OF THE INVENTION

Exemplary embodiments of the invention relate to a hybrid drive device having an internal combustion engine, an electric motor, and a gearbox, as well as to a hybrid vehicle having two driven axles and a method for operating such a hybrid vehicle having a special embodiment of the hybrid drive device.

Hybrid drive devices having planetary gearings to which an internal combustion engine and an electric motor are connected at different shafts, are known from the prior art, for example from US 2004/0 077 448 A1.

DE 10 2017 006 082 A1 primarily describes a generic hybrid drive device. In the hybrid drive device, there with an internal combustion engine, an electric motor, which has a rotor, a gearbox having an input planetary gearing having a main axis of rotation, wherein the internal combustion engine is connected to the input planetary gearing via a disconnect clutch, wherein the input planetary gearing has exactly two planetary gear sets, of which the first planetary gear set comprises a first element, a second element, and a third element, of which the second planetary gear set comprises a fourth element, a fifth element, and a sixth element, wherein the third element is connected to the sixth element for conjoint rotation, wherein the second element is connected to the fifth element for conjoint rotation, wherein the rotor is coupled to the third element in such a way that torques originating from the rotor can be introduced into the gearbox via the third element and the sixth element.

Exemplary embodiments of the present invention are directed to an improved hybrid drive device, an improved hybrid vehicle, and improved operation method for same.

The hybrid drive device according to the invention comprises a four-shaft input planetary gearing to which the internal combustion engine and an electric motor are accordingly connected, as is known in principle from the generic prior art. The embodiment according to the invention thus provides a third planetary gear set inside the gearing, which is connected to a driven gear for conjoint rotation in order to discharge torque from the gearing. This allows for an efficient and above all compact, construction in the axial direction to be achieved.

In the meaning of the invention, a connection for conjoint rotation of two rotatably mounted elements is understood to mean that these are connected to each other in such a way that they are arranged coaxially to each other and rotate at the same speed. One element, which in this meaning is connected to a housing for conjoint rotation, is then connected to the housing in such a way that it cannot be rotated relative to the housing.

According to a very advantageous development of the hybrid drive device according to the invention, the disconnect clutch is designed to connect a crankshaft of the internal combustion engine to the first element of the first planetary gear set of the internal combustion engine for conjoint rotation. The torque of the internal combustion engine is thus introduced into the gearing via the first element. This first element can be, in particular, the sun gear of the first planetary gear set inside the input planetary gearing.

A further very advantageous embodiment of the hybrid drive device further provides that a first switching element is provided that is designed to connect the ninth element of the third planetary gear set to a housing of the gearing for conjoint rotation. This ninth element which preferably can be the ring gear of the third planetary gear set, can therefore be connected to the housing for conjoint rotation via this first switching element, so that this ninth element is held firmly.

A further very advantageous embodiment of the hybrid drive device according to the invention then further provides that a second switching element is provided and designed to block the input planetary gearing. Such a switching element, which is also referred to as a blocking switching element, can therefore connect two elements of the input planetary gearing, which are not permanently connected to one another for conjoint rotation, to one another for conjoint rotation, in order to block them and thus change the transmission ratio by the planetary gearing. Preferably, the blocking switching element can be arranged so that it connects the first and third element of the first planetary gear set to each other for conjoint rotation; preferably these could be its sun gear and ring gear. A blocking of the input planetary gearing is understood to mean a connection for conjoint rotation of all six mentioned elements of the input planetary gearing. In the blocked state of the input planetary gearing, all six of these elements of the input planetary gearing rotate at the same speed.

Furthermore, according to a very advantageous development a third switching element can additionally be provided that is set up to connect the fourth element to the eighth element for conjoint rotation. The fourth element could therefore preferably be the sun gear of the second planetary gear set, which can correspondingly be connected for conjoint rotation to the eighth element, preferably the planetary carrier of the third planetary gear set, by the third switching element.

The entire construction is then built according to a further very favorable embodiment of this variation of the invention so that, seen in the direction of the main axis of rotation, the second switching element, i.e., the blocking switching element, the first planetary gear set, the second planetary gear set, the third switching element, and the third planetary gear set are arranged successively in the mentioned order. Therefore, an extraordinarily compact construction of the hybrid drive device can be implemented in the axial direction, i.e., along the main axis of rotation. An axis of rotation of the input planetary gearing is what is meant by the main axis of rotation of the gearing. All six elements of the input planetary gearing are arranged coaxially to this axis of rotation or coaxially to the main axis of rotation.

Furthermore, according to a further very favorable embodiment it can be provided that, seen in the direction of the main axis of rotation, the input planetary gearing, the third planetary gear set, the driven gear, the disconnect clutch, and the internal combustion engine are arranged successively in the mentioned order. Finally, this leads to a compact embodiment of the hybrid drive device.

Alternatively, or additionally, a further very favorable embodiment can also provide in this meaning that the rotor of the electric motor is arranged coaxially, axially overlapping, and radially surrounding in relation to at least one, preferably all, planetary gear sets. Such a construction similarly enables an extraordinarily compact embodiment.

In the meaning of the invention, axially overlapping means that two elements overlap axially when they are arranged in such a way that they are each arranged at least partially in the same axial region, each in relation to the main axis of rotation. In other words: The two elements each have at least partially the same coordinates in a coordinate axis, which is arranged parallel to the main axis of rotation. The term axial refers to the direction of the main axis of rotation, here as explained above the axis of rotation of the elements of the input planetary gear, which coincides here with an axis of rotation of the third planetary gear set.

In the meaning of the invention, an element is arranged radially surrounding in relation to another element, when these two elements are arranged coaxially to each other and when the element, in relation to the common axis of rotation of the two mentioned elements, is arranged in a region with a larger radius than the other element.

In other words, at least one of the three planetary gear sets, preferably all three planetary gear sets, is arranged inside a cylinder that is arranged coaxially to the main axis of rotation and its radius is the same as an inner radius of the rotor.

As already explained, according to a very advantageous development of the hybrid drive device according to the invention the first element can be designed as a first sun gear, the second element as a first planetary carrier, the third element as a first ring gear, the fourth element as a second sun gear, the fifth element as a second planetary carrier, the sixth element as a second ring gear, the seventh element as a third sun gear, the eighth element as a third planetary carrier, and the ninth element as a third ring gear. Each of the three planetary gear sets therefore has exactly these three elements: sun gear, planetary carrier with the planets present hereon, and the ring gear. The ring gears of the individual planetary gear sets are therefore preferably designed so that at least the two ring gears, i.e., the third element and the sixth element, are designed with different diameters in order to increase the variability when generating different transmission ratios.

With the hybrid vehicle it can now be provided that this has a first driven vehicle axle, which is in a driving connection to a hybrid drive device according to one of the above-described embodiments and has a second driven vehicle axle, which is in a driving connection exclusively with a second electric motor. According to a further very advantageous embodiment of this hybrid vehicle, the two electric motors are thus at least indirectly electrically coupled. Electric power from one motor can be transmitted to the other motor in order to drive, for example, the second electric motor on the second vehicle axle by a regenerative mode of the first motor. This enables a four-wheel drive with power exclusively from the region of the internal combustion engine, or, in the case of an intermediate electric energy storage device, such as a traction battery for example, alternatively or additionally with power from simply this electric energy store.

With a method according to the invention for operating a hybrid vehicle of this kind having a hybrid drive device, it can be provided that with a closed disconnect clutch, an open second switching element, i.e., the blocking switching element, a closed first switching element, i.e., preferably a connection between the ring gear of the third planetary gear set and the housing, and an open third switching element, i.e., preferably a planetary carrier of the third planetary gear set released from the sun gear of the input planetary gear, a drive in parallel occurs via the first electric motor and the internal combustion engine, by which both of these are driven. According to the method according to the invention, the second electric motor can now be operated in regenerative mode simultaneously, so that this obtains electrical energy over the non-driven other vehicle axle and the movement occurring there, and the electrical energy can be used to drive the first electric motor or in the case of surplus energy being present could be stored into the battery. Alternatively, the electric drive of the first electric motor can naturally also be supported for the power transmission from the second electric motor in regenerative mode by electric power from the battery.

Further advantageous embodiments of the hybrid drive device, of the hybrid vehicle and of the method according to the invention can be found in the exemplary embodiment which is presented in more detail below with reference to the figures.

BRIEF DESCRIPTION OF THE DRAWING FIGURES

Here:

DETAILED DESCRIPTION

Figure 1:
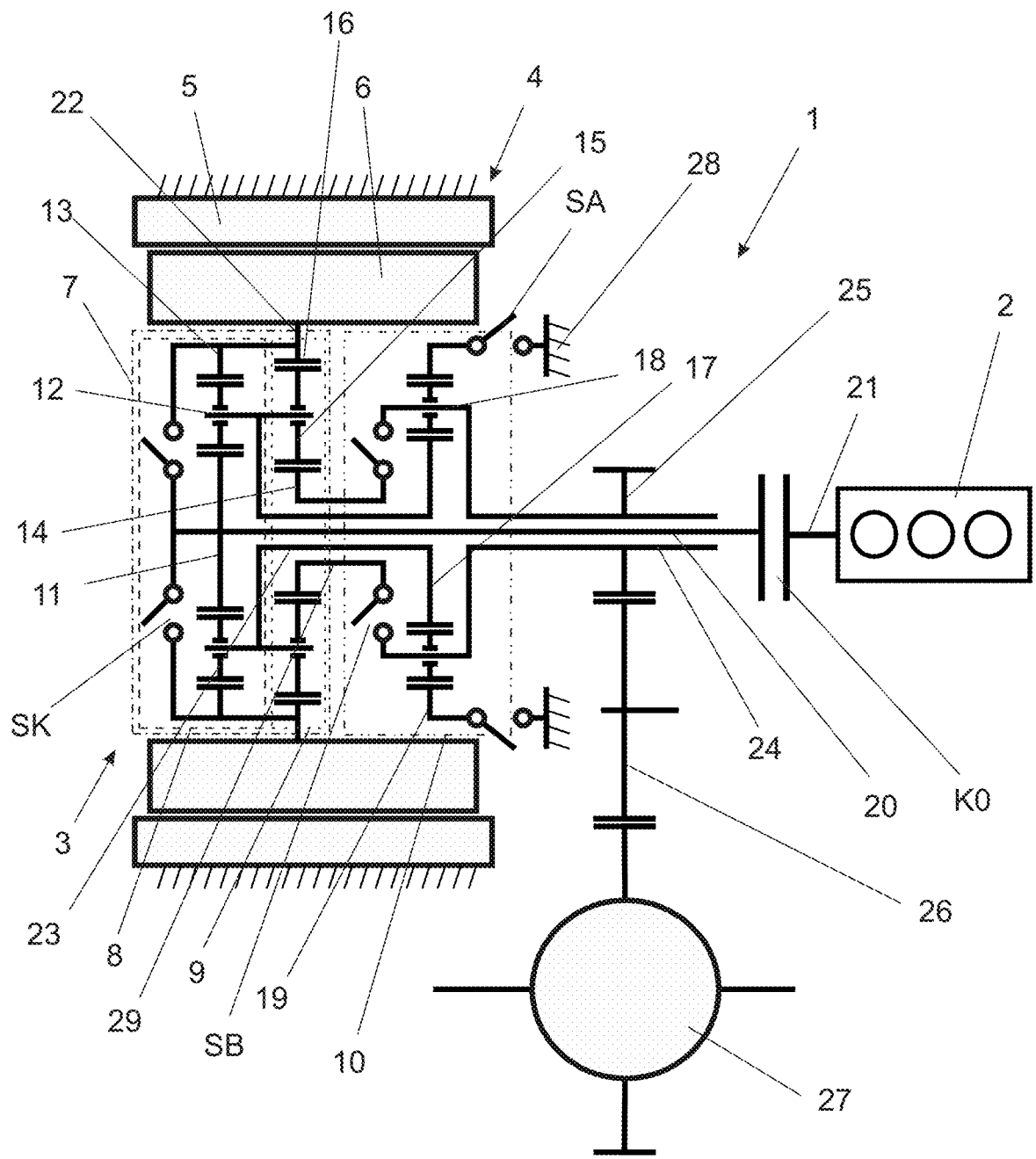
FIG. 1 shows a possible embodiment of a hybrid drive device according to the invention.

In the illustration of FIG. 1, a hybrid drive device 1 can be seen which has an internal combustion engine 2, a gearbox 3, and an electric motor 4. The electric motor 4 comprises a stator 5 fixed to the housing, and a rotor 6. The gearbox 3 comprises an input planetary gearing 7, which is outlined here with a dash-dotted line. This input planetary gearing 7 has exactly two planetary gear sets 8, 9, wherein in the illustration of FIG. 1 the first planetary gear set 8 is outlined with a dashed line and the second planetary gear set 9 with a dotted line. The gearbox 3 further comprises a third planetary gear set 10, which is outlined with a dash-two-dotted line and is not designed as part of the input planetary gear 7. The first planetary gear set 8 comprises a first element 11, a second element 12, and a third element 13. The second planetary gear set 9 comprises a fourth element 14, a fifth element 15, and a sixth element 16. In the embodiment illustrated here, the first element 11 is thus a sun gear, similarly to the fourth element 14. The second element 12 is, similarly to the fifth element 15, designed as a planetary carrier, wherein the planets arranged thereon (not labelled) are included. The respective third element 13 and the respective sixth element 16 are designed as ring gears. These two ring gears, as the third and sixth element 13, 16, thus have different diameters and numbers of teeth. In the third planetary gear set 3, the seventh element 17 is designed as a sun gear, the eighth element 18 as a planetary carrier and the ninth element 19 as a ring gear.

An input shaft 20 thus simultaneously forms the main axis of rotation of the input planetary gear 7. This input shaft 20 can be connected via a disconnect clutch K0 to a crankshaft 21 of the internal combustion engine 2, so that the internal combustion engine 2 can introduce torque into the input planetary gear 7 and thus into the gearbox 3. The input shaft 20 is connected for conjoint rotation in the region of the input planetary gear 7 to the first element 11, i.e., the sun gear of the first planetary gear set 8. This sun gear, as a first element 11, meshes with the planets on the planetary carrier 12 as a second element and with the ring gear as a third element 13. Two elements of the input planetary gear 7, that are otherwise not permanently connected for conjoint rotation can be connected for conjoint rotation via a blocking switching element SK, in this case the first element 11, i.e., the sun gear of the first planetary gear set 8, and the third element 13, as its ring gear.

In the direction of the input shaft 20, seen as a main axis of rotation, the first planetary gear set 8 and then the second planetary gear set 9, so its fifth element 15, i.e., planetary carrier, is connected for conjoint rotation to the second element 12, i.e., planetary carrier of the first planetary gear set 8, follows the blocking switching element SK, which in the meaning of the invention forms the second switching element SK. Also, its sixth element 16, i.e., the ring gear of the second planetary gear set 9, is connected for conjoint rotation to the third element 13, i.e., the ring gear of the first planetary gear set 8. Both together are attached to the rotor 6 for conjoint rotation via a connection 22, so that the electric motor 4 can introduce torque by its rotor 6 via the two ring gears, as a third element 13 and a sixth element 16 into the input planetary gear 7, or, in the case of a regenerative mode of the electric motor 4, can discharge from the input planetary gear 7 to this.

The two planetary carriers connected to each other for conjoint rotation, i.e., the second element 12 and the fifth element 15, are connected for conjoint rotation to the seventh, here the sun gear of the third planetary gear set 10, via a first hollow shaft 23. The eighth element 18, here the planetary carrier of the third planetary gear set 10, is connected for conjoint rotation via a second hollow shaft 24 to a driven gear 25, by which torque is discharged from the gearbox 3 and guided via an intermediate gear 26 in the exemplary embodiment presented here to a differential 27. The ninth element 19, the ring gear of the third planetary gear set 10, which follows the second planetary gear set 9 along the input shaft 20 as a main axis of rotation, can be connected via a first switching element SA to a housing 28 of the gearbox 3. The driven gear 25, the disconnect clutch K0 and the internal combustion engine 2 then follow the third planetary gear set 10 along the main axis of rotation.

Via a third hollow shaft 29, which on the one hand surrounds the input shaft 20, such as all three hollow shafts 23, 24, 29, and on the other hand the first hollow shaft 23, the fourth element 14, i.e., the sun gear of the second planetary gear set 9, can also be connected via a third switching element SB to the eighth element 18, i.e., the planetary gear carrier, and indirectly via this to the driven gear 25. The third switching element SB is arranged here, seen along the main axis of rotation, between the input planetary gear 7 or its second planetary gear set 9 and the third planetary gear set 10.

Figures 2, 3:
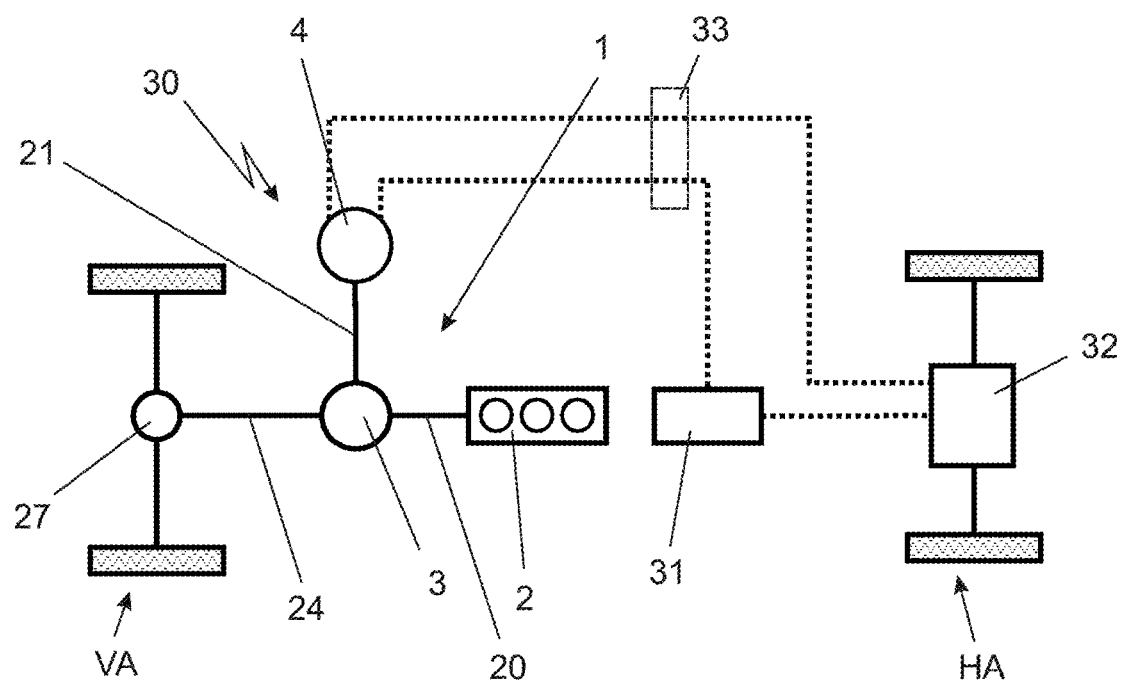
FIG. 2 shows a schematic representation of a hybrid vehicle in a possible embodiment according to the invention.
FIG. 3 shows a switching table to explain the possible switching states of the gearing of the hybrid drive device according to the invention.

As shown in FIG. 2, the differential 27 is then used to drive the wheels of a front axle VA of a hybrid vehicle designated in its entirety as 30.

In addition to the hybrid drive device 1, with the internal combustion engine 2, the electric motor 4, and the gearbox 3, the hybrid vehicle 30 also has a second driven axle, which is formed here by the rear axle HA. This is exclusively driven by a second electric motor 32. In addition to the mechanical active connections shown with a solid line in the illustration of FIG. 2, there is also an electrical connection between the electrical engine or first electrical engine 4 and the second electrical engine 32, which is indicated here with a dotted line. Furthermore, both electric motors 4, 32 are also connected to each other via a battery 31. Naturally, a power electronics unit 33 is also provided here in practice, but this is shown here merely schematically to simplify the illustration. The division of the drive technologies to the rear axle HA and front axle VA is thus chosen in a purely exemplary manner; it could also be reversed.

In the illustration in FIG. 2, the gearbox 3 is connected to the internal combustion engine 2 via the input shaft 20, without the disconnect clutch K0 and the crankshaft 21 being shown again. The connection between the gearbox 3 and the differential 27 is symbolized exclusively by the second hollow shaft 24 as the output shaft of the gearbox 3, without the intermediate gear 26 and the driven gear 25 represented in FIG. 1. The connection between the gearbox 3 and the first electric motor 4 is indicated by the connection 22.

In the illustration in FIG. 3, now a switching table for the gearbox 3 can be seen in the hybrid drive device 1. In the first column, the respective state is indicated under the heading "State", in the second column under the heading "K0" the state of the disconnect clutch. A dot means that the disconnect clutch K0 is closed, which it is here in all five states shown by way of example. In the next column, the state of the second switching element SK, i.e., the blocking switching element, can be seen. This is closed in the second and fourth row, open in the other rows. In the next column, the state of the first switching element SA is correspondingly indicated, in the final column that of the third switching element SB.

All conceivable variants of the drive according to FIG. 2 are explained below briefly, wherein the directions of rotation of the input shaft 20, the second hollow shaft 24 and the connection 22, and thus of the first electric motor 4, are discussed in each case.

A first basic variant would be to design the operation in a such a way that the second hollow shaft 24 forms the sum shaft of the gearbox 3, i.e., the torques of the input shaft 20 and the connection 21 and thus of the internal combustion engine 2 and the first electric motor 4 are summed accordingly, wherein the torque of the first electric motor 4 can also be negative when it is in regenerative mode. The second variant is that the input shaft 20 forms the sum shaft of the gearbox 3.

The first state, which is labelled with EVT A in the switching table according to FIG. 3, exclusively uses the first switching element SA when the disconnect clutch K0 is closed, thus the ninth element 19, i.e., the ring gear of the third planetary gear set 10 is fixed on the housing 28 of the gearbox 3. In this state, a mode known as EVT mode with stepless operation can now be enabled. The EVT operation allows the stepless adjustment of the output torque by an overlay of the drive types. For example, it allows a drive on the front axle VA and on the rear axle HA simultaneously. The internal combustion engine 2 supplies power via the input shaft 20 to the differential 27 on the one hand and the first electric motor 4 in the regenerative mode on the other hand. The direction of rotation of the input shaft 20 and the first hollow shaft 24, which functions here as a sum shaft, are thus positive, the direction of rotation of the connection 22 is negative, similarly to the pending torque from the view of the sum shaft. The second electric motor 32 can now be operated with the electric power, which is generated by the first electric motor 4, wherein additional power from the battery 31 can be supplied to the second electric motor 32. A further possibility that can be achieved by a simple reversal of the direction of rotation of the connection 22, is the electric drive of the first electric motor 4 in motor mode, so that the torques overlap in the region of the sum shaft, which is formed here by the second hollow shaft 24, so that a booster mode so to speak is provided. The required power comes from the battery 31. Optionally, the second electric motor 32 and thus the rear axle HA can also be driven via the battery 31.

The special feature is now exactly the same constellation, but in which the rear axle HA is also towed, so that the second electric motor 32 is in the regenerative mode. It then supplies, alone or in addition to the electric power from the battery 31, the power required to drive the first electric motor 4, which transmits its power to the differential 27 as a sum shaft when the connection 22 rotates in the positive direction and the input shaft 20 and the second hollow shaft 24 rotate in the corresponding positive direction.

In the subsequent switching state, a change is then made to first gear (gear 1), for which purpose the blocking switching element SK, i.e., the second switching element according to the nomenclature of the invention, is brought into engagement. When changing to second gear (gear 2), the blocking switching element SK is opened, and the third switching element SB is engaged. When subsequently changing to third gear (gear 3), the third switching element SA is then opened and the ninth element 19, i.e., the ring gear of the third planetary gear set 10, is released relative to the housing 28. At the same time, the blocking switching element SK is again engaged as a second switching element, which blocks the first planetary gear set 8. This makes it possible to drive in gear 1, gear 2, and gear 3, in which torque is typically generated via the first electric motor 4, as well as via the internal combustion engine 2 or just one of the two. Any electrical power that may be required again comes from the battery 31 or can optionally also come from the second electric motor 32 in regenerative mode for certain situations, as described above.

If the blocking switching element SK is then released again, the state labelled EVT B is reached. In this case, the sum shaft is now formed by the input shaft 20 and the first electric motor 4 can be operated in a regenerative mode, for example when the input shaft 20, the second hollow shaft 24 and the connection 21 rotate in a positive direction, in order to supply power to the second electric motor 32. Alternatively, additional power can be provided from the battery 31. Both axles VA and HA are thus driven.

An alternative to all-wheel drive in the state EVT B would be, for example, pure drive of the front axle VA under otherwise identical conditions, except that in this case the electrical power of the first electric motor 4 does not reach the second electric motor 32 in regenerative mode but is used to charge the battery 31. Front wheel operation with a power booster via the first electric motor 4 with electric power from the battery 31 would also be conceivable. In this case, the direction of rotation of the connection 22 would be reversed to be negative. If the direction of rotation of the input shaft 20 and the second hollow shaft 24 as the output shaft remains positive, the power is then transmitted from both drive machines, i.e., the first electric motor 4 and the internal combustion engine 2, to the differential 27 and thus to the driven front axle VA. Again, it would be conceivable in this situation to operate the second electric motor 32 in a regenerative mode and to utilize the power generated by it instead of the power from the battery 31 or, in addition to this, for the motor drive of the first electric motor 4.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A hybrid drive device comprising:
an internal combustion engine;
an electric motor having a rotor; and
a gearbox comprising an input planetary gearing having a main axis of rotation,
wherein the internal combustion engine is connected to the input planetary gearing via a disconnect clutch,
wherein the input planetary gearing has exactly two planetary gear sets, which consists of a first and second planetary gear set, wherein the first planetary gear set comprises a first element, a second element, and a third element, and wherein the second planetary gear set comprises a fourth element, a fifth element, and a sixth element,
wherein the third element is connected to the sixth element to conjointly rotate,
wherein the second element is connected to the fifth element to conjointly rotate,
wherein the rotor is coupled to the third element in such a way that torques, originating from the rotor, are introducible into the gearbox via the third element and the sixth element,
wherein the gearbox has a third planetary gear set comprising a seventh element, an eighth element, and a ninth element,
wherein the second element is connected to the seventh element to conjointly rotate, and
wherein the eighth element is connected to conjointly rotate to a driven gear that discharges torque from the gearbox;
a second switching element configured to block the input planetary gearing; and
a third switching element configured to connect the fourth element to the eighth element to conjointly rotate,
wherein seen in a direction of the main axis of rotation, the second switching element, the first planetary gear set, the second planetary gear set, the third switching element, and the third planetary gear set are arranged successively in the recited order.

2. The hybrid drive device of claim 1, wherein the disconnect clutch is configured to connect a crankshaft of the internal combustion engine to the first element to conjointly rotate.

3. The hybrid drive device of claim 1, further comprising:
a first switching element configured to connect the ninth element to a housing of the gearbox to conjointly rotate.

4. The hybrid drive device of claim 2, wherein seen in a direction of the main axis of rotation, the input planetary gearing, the third planetary gear set, the driven gear, the disconnect clutch, and the internal combustion engine are arranged successively in the recited order.

5. The hybrid drive device of claim 1, wherein the rotor is arranged coaxially, axially overlapping and radially surrounding in relation to at least one of the first, second, and third planetary gear sets.

6. The hybrid drive device of claim 1, wherein the first element is a first sun gear, the second element is a first planetary carrier, the third element is a first ring gear, the fourth element is a second sun gear, the fifth element is a second planetary carrier, the sixth element is a second ring gear, the seventh element is a third sun gear, the eighth element is a third planetary carrier, and the ninth element is a third ring gear.

7. A hybrid vehicle comprising:
a first driven vehicle axle;
a hybrid drive device in driving connection with the first driven vehicle axle, the hybrid drive device comprising an internal combustion engine;
an electric motor having a rotor; and
a gearbox comprising an input planetary gearing having a main axis of rotation,
wherein the internal combustion engine is connected to the input planetary gearing via a disconnect clutch,
wherein the input planetary gearing has exactly two planetary gear sets, which consists of a first and second planetary gear set, wherein the first planetary gear set comprises a first element, a second element, and a third element, and wherein the second planetary gear set comprises a fourth element, a fifth element, and a sixth element,
wherein the third element is connected to the sixth element to conjointly rotate,
wherein the second element is connected to the fifth element to conjointly rotate,
wherein the rotor is coupled to the third element in such a way that torques, originating from the rotor, are introducible into the gearbox via the third element and the sixth element,
wherein the gearbox has a third planetary gear set comprising a seventh element, an eighth element, and a ninth element,
wherein the second element is connected to the seventh element to conjointly rotate, and
wherein the eighth element is connected to conjointly rotate to a driven gear that discharges torque from the gearbox;
a second driven vehicle axle;
a second electric motor, wherein the second driven vehicle axle is in driving connection exclusively with the second electric motor;
a second switching element configured to block the input planetary gearing; and
a third switching element configured to connect the fourth element to the eighth element to conjointly rotate,
wherein seen in a direction of the main axis of rotation, the second switching element, the first planetary gear set, the second planetary gear set, the third switching element, and the third planetary gear set are arranged successively in the recited order.

8. The hybrid vehicle of claim 7, wherein the electric motor and the second electric motor are at least indirectly electrically coupled.

9. A method for operating the hybrid vehicle of claim 7, wherein the method comprises:
operating the first electric motor and the internal combustion engine in driving mode and at a same time operating the second electric motor in regenerative mode by closing the disconnect clutch, opening the second switching element, closing first switching element, and opening third switching element.

* * * * *